Nov. 5, 1935. G. D. BOERLAGE 2,019,948
APPARATUS FOR TESTING LUBRICANTS
Filed May 2, 1934
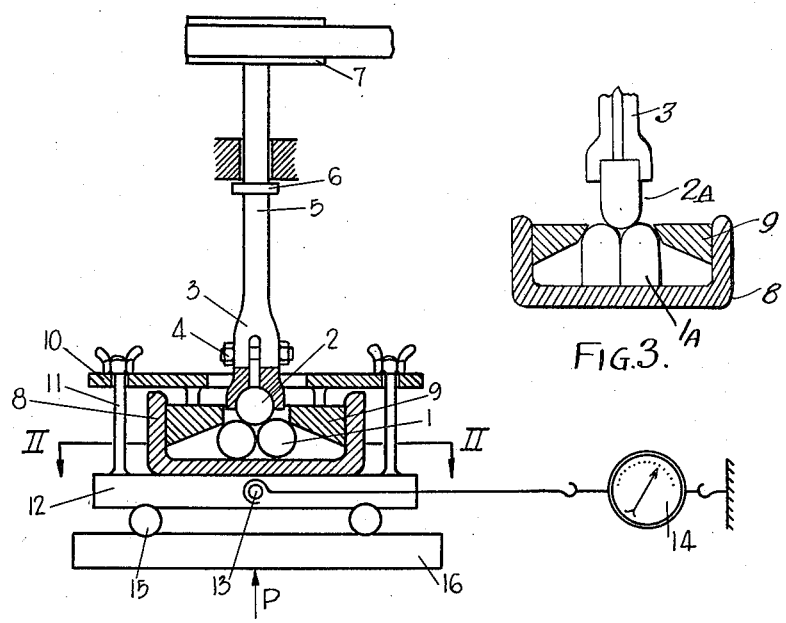
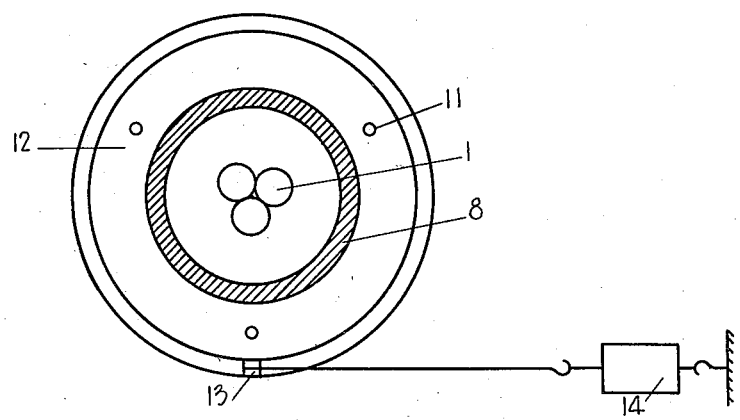
Inventor: Gerrit Daniel Boerlage
By his Attorney Patented Nov. 5, 1935

2,019,948

UNITED STATES PATENT OFFICE 2,019,948

APPARATUS FOR TESTING LUBRICANTS

Gerrit Daniel Boerlage, Delft, Netherlands, assignor to Shell Development Company, San Francisco, Calif., a corporation of Delaware Application May 2, 1934, Serial No. 723,478
In Great Britain May 10, 1933

6 Claims. (Cl. 265—10)

The invention relates to an apparatus adapted for testing lubricants, particularly for investigating the lubricating qualities thereof under extremely heavy conditions of pressure and rubbing speed.

It is an object of the invention to provide an apparatus of simple and rugged construction, in which the conditions of pressure and velocity can be readily adjusted and in which the surfaces which are subjected to wearing during the test, can be easily examined after such test and be renewed in an easy and inexpensive manner.

According to the invention, use is made of three contacting balls of suitable material, e. g. steel, which are held in a fixed position relative to each other, and a fourth ball contacting with and centered by the set of three balls. The said fourth ball is pressed against the three balls with a preferably adjustable force, and a rotating movement is set up between the set of three balls and the fourth ball. The contacting points of the three balls with the fourth ball are kept wetted by the lubricant to be tested, e. g. by immersing the balls in a bath of the lubricant.

An apparatus embodying the invention is diagrammatically illustrated on the annexed drawing, in which Figure 1 shows a central sectional elevation and Figure 2 a cross-sectional plan view along the line II—II of Figure 1. A central sectional elevation of a modified part of the apparatus is shown in Figure 3.

Referring to Figure 1; within a cup 8 partially filled with the lubricant to be tested three balls 1 are arranged pressed downwardly and inwardly by means of an annular member 9 having a conical lower surface, so that the balls are firmly pressed against the bottom of the cup and against each other and held in a fixed position. The cup 8 is placed on a table 12; a flange-shaped member 10 bearing on the annular member 9 is pressed downwardly by means of wing nuts provided on bolts 11 connected to table 12.

The table 12 rests on a base 16, ball-bearings 15 being arranged between the table and the base so as to allow a rotational movement of the former in relation to the latter. An upwardly directed force P may be applied to the base e. g. by hydraulic means.

Cooperating with the three balls 1 is a fourth ball 2 fixedly clamped in a split, fork-shaped holder 3, the prongs of which are pressed together by means of a bolt and nut 4. The holder 3 is connected to a shaft 5 supported in suitable bearings, which shaft can be rotated by means of a driving means, such as a driving pulley 7, a motor directly coupled to the shaft or like means. An upward movement of the shaft is prevented, e. g. by means of a shoulder 6 formed thereon. To a pin 13 arranged at the periphery of table 12 a wire is attached, the other end of which actuates a spring balance 14 or like device adapted to measure the force with which the table 12 tends to rotate.

A test can be carried out with the apparatus as follows:

Three new balls of standard quality such as are generally used in ball-bearings are put into the cup 8 and are clamped in a fixed position by inserting ring 9 and pressing it down by means of member 10 and the wing nuts on bolts 11. The lubricant to be tested is poured into the cup in such a quantity that the balls are immersed therein. A fourth ball is clamped into holder 3. Then the table 16 is raised by applying a force P thereto, so that the one ball contacts with the three others, and shaft 5 is put into rotation. Force P and the number of rotations per time unit of shaft 5 are preferably adjustable. The moment of the forces transferred from ball 2 to the balls 1 through friction action can be measured by means of spring balance 14 or any other device of this kind. The magnitude of the said moment and any changes thereof during the test provide valuable indications of the extreme pressure qualities of the lubricant under test.

After the testing apparatus having run a certain time, the balls can be taken out and examined to investigate the wear they have undergone. The area of the wear surfaces formed on the balls under the extreme pressure condition provides a further measure for the lubricating properties of the lubricant under the circumstances chosen. Finally it may be investigated under what pressure a lubricant can operate during a predetermined time without seizing occurring.

It will be obvious from the foregoing that extremely high pressures per unit of contact area between the balls, as well as high rubbing speeds may be easily obtained, and that the apparatus, if a test has been carried out, may be readily brought into order for a new test.

Instead of using a set of three balls another number of balls may be used, although three is the number preferably chosen as being the most advantageous.

According to the modification of the invention shown in Figure 3, the balls are substituted by cylinders with parallel axes, each cylinder having one end of spherical or like shape. The three or more cylinders (1A) of the lower set are of exactly the same length, being for example, three to four times the radius. Such a set of cylinders, with their rounded ends upwards, can be clamped in position in the cup exactly in the same way as the balls of the other arrangement, the contact with the upper cylinder (2A) having its rounded end turned downwardly being also of the same nature. An advantage of the spherically-ended cylinders resides in their simple construction as compared with balls, which is of importance when it is desired to investigate the behavior of metal surfaces of a material other than generally used for balls of ball-bearings, for example, the behavior of special alloys in connection with the lubricant to be tested.

I claim as my invention:

1. Apparatus for testing lubricants comprising members having spherical portions, means for clamping said members in fixed position against each other, an additional member having a spherical portion adapted to contact with said clamped members, and means for rotating said additional member.

2. Apparatus for testing lubricants comprising balls, means for clamping said balls in fixed position against each other, an additional ball adapted to contact said clamped balls, and means for rotating said additional ball.

3. Apparatus for testing lubricants comprising identical cylinders having semi-spherical ends, means for clamping said cylinders in fixed position with their semi-spherical ends uppermost, a similar cylinder having a semi-spherical end adapted to contact said clamped cylinders with its spherical end downward, and means for rotating said similar cylinder.

4. Apparatus for testing lubricants comprising a cup, balls therein, a ring-shaped body for clamping said balls in fixed position, said ring-shaped body having its underside conical whereby the balls are pressed toward the center of the cup and against each other, an additional ball adapted to contact said clamped balls, and means for rotating said additional ball.

5. Apparatus for testing lubricants comprising balls, means for clamping said balls in fixed position against each other, an additional ball adapted to contact said clamped balls, a holder for said additional ball, and a rotatable shaft connected to said holder and having its axis perpendicular to the plane in which the centres of the said clamped balls are positioned.

6. Apparatus for testing lubricants comprising balls, means for clamping said balls in fixed position against each other, an additional ball adapted to contact said clamped balls, means for rotating said additional ball, a table supporting said clamped balls, means for maintaining a desired pressure between said clamped balls and said additional ball, and means for measuring the moment of force transferred to said table from said additional ball.

GERRIT DANIEL BOERLAGE